United States Patent [19]

Jeans

[11] 4,353,252

[45] Oct. 12, 1982

[54] LIQUID LEVEL SENSOR

[75] Inventor: Edward L. Jeans, Ledbury, England

[73] Assignee: Cadbury Schweppes PLC, London, England

[21] Appl. No.: 200,021

[22] Filed: Oct. 23, 1980

[51] Int. Cl.$^3$ .......................................... G01F 23/00
[52] U.S. Cl. ...................................... 73/293; 116/227
[58] Field of Search ......................... 73/293; 116/227; 350/96.15, 96.14

[56] References Cited

U.S. PATENT DOCUMENTS

| | | |
|---|---|---|
| 461,370 | 10/1891 | Seidensticker . |
| 2,190,027 | 2/1940 | Jordan ................................. 116/227 |
| 2,240,988 | 5/1941 | Hertel . |
| 2,468,833 | 5/1949 | Murphy . |
| 2,548,352 | 4/1951 | Courtot ............................... 116/227 |
| 2,554,557 | 5/1951 | Brown et al. . |
| 3,054,291 | 9/1962 | Landwer . |
| 3,120,125 | 2/1964 | Vasel . |
| 3,152,723 | 10/1964 | Perl et al. . |
| 3,272,174 | 9/1966 | Fribonic . |
| 3,319,597 | 6/1967 | Schnitzius et al. . |
| 3,338,457 | 8/1967 | Tygenhof . |
| 3,397,808 | 8/1968 | Jones . |
| 3,498,141 | 3/1970 | Nelson et al. . |
| 3,535,934 | 10/1970 | Rapata . |
| 3,568,628 | 3/1971 | Erickson . |
| 3,570,311 | 3/1971 | Nelson . |
| 3,648,521 | 3/1972 | Amendolia ............................ 73/293 |
| 3,834,235 | 9/1974 | Bouton et al. . |
| 3,893,339 | 7/1975 | Melone . |
| 4,156,149 | 5/1979 | Vaccari ................................ 73/293 |

FOREIGN PATENT DOCUMENTS 630191 10/1961 Canada ................................. 73/293

Primary Examiner—Anthony V. Ciarlante
Assistant Examiner—Denis E. Corr
Attorney, Agent, or Firm—Kenyon & Kenyon

[57] ABSTRACT

In order to sense a liquid level, an input light pipe and output light pipe have angled ends such that light supplied to the input light pipe is directed from it to the output light pipe by total internal reflection as long as the ends are in a gas. When in a liquid, the index is such as to cause light in the input light pipe to refract into the liquid and not reach the output light pipe. By observing the other end of the output light pipe it becomes possible to determine if the angled ends are in liquid or gas, and thus detect a liquid level.

12 Claims, 8 Drawing Figures

U.S. Patent    Oct. 12, 1982    Sheet 1 of 2    4,353,252
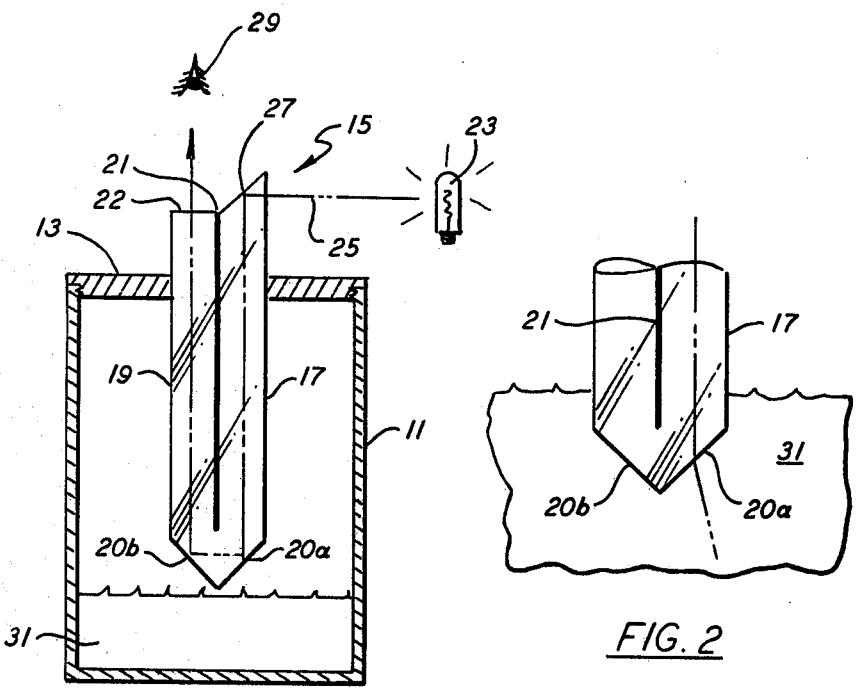
FIG. 1
FIG. 2
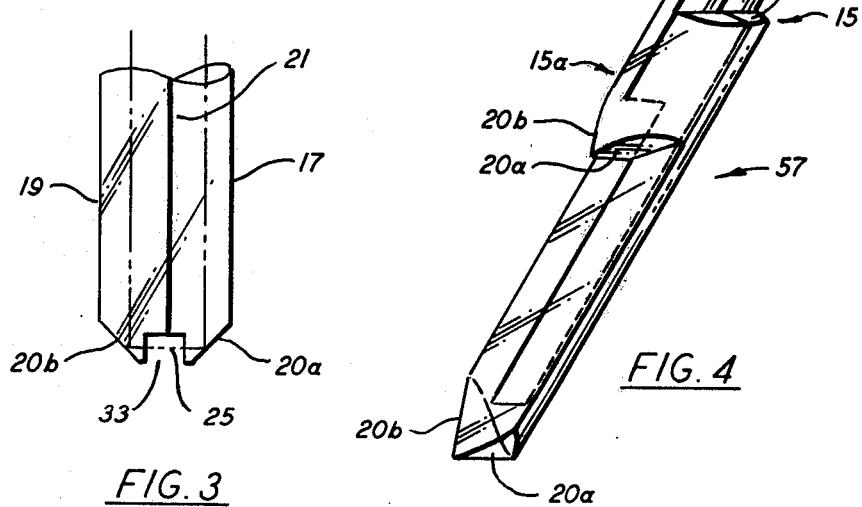
FIG. 3
FIG. 4

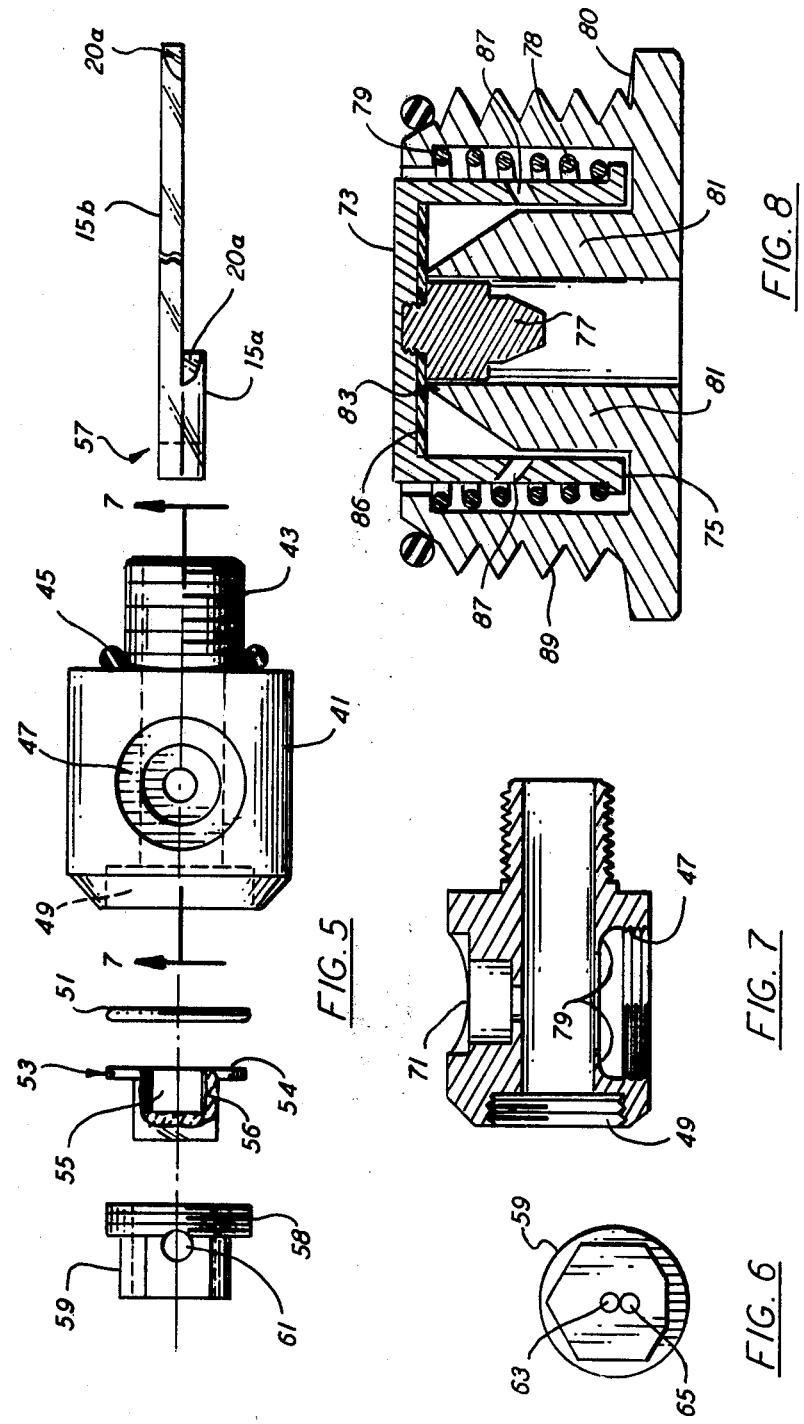

LIQUID LEVEL SENSOR

BACKGROUND OF THE INVENTION

This invention relates to level sensing in general and, more particularly, to an improved, compact level sensing device which makes use of total internal reflection of light.

There are many applications for sensing the level of a liquids, or even powders, enclosed in vessels of varying sizes. Various types of sensors relying on electrical and optical principles have been developed for these purposes. However, for the most part, pre-existing sensors are relatively expensive, difficult to install and subject to failure. It is, thus, evident that there is a need for improved level sensor, particularly one which can be used for sensing both liquid and powder levels, which is simple and inexpensive to construct, easy to install and use, and reliable.

SUMMARY OF THE INVENTION

The present invention provides such a sensor. In its simplest form, the present invention comprises two light pipes or optical conductors disposed adjacent each other, each terminating in an angled portion making a 45° angle with the longitudinal dimension of the optical conductors such that, when light is reflected by total internal reflection, it will be reflected along an essentially non-refractive light path, from the angled surface of one optical conductor to the angled surface of the other. Preferably the input and output light pipes are abutting with an opaque baffle between them except in the area of the angled portions. Light is introduced into one of the optical conductors (the input light pipe), is conducted to the angled reflecting surface, from which it is reflected to a corresponding reflecting surface of the other optical conductor (the output light pipe), and then reflected to the opposite end thereof where it exits the optical conductor.

The present invention relies on the laws of total internal reflection. For example, in a typical plastic light pipe which has an index of refraction of 1.5, if the index of the material on the other side of the angled surface is low enough, such as the index of air and most other gases and vapors, there will be total internal reflection. However, if the index of the material on the other side of the reflecting surface is greater, such as the index of water or another liquid, rather than total internal reflection taking place, the light will pass through the surface and be refracted. Thus, if the device of the present invention is immersed in a liquid, light will not be reflected from one angled surface to the other, but will be absorbed within the liquid and thus will not be visible at the output light pipe. However, if the liquid level drops so that material on the other side of the angled surface is air or another gas or vapor of low refractive index, total internal reflection will take place, causing light to reach the output. In this manner, it is possible to detect when the level has dropped to a certain point simply by observing the output light pipe.

In accordance with a further embodiment of the present invention, a gap is formed between the two light pipes in the path of rays reflected from one reflecting surface to the other. Operation in a liquid will be as just described. Since the rays run essentially perpendicular through the gap, there will be no refraction or reflection. Thus, this device will still work with liquids. However, it also provides an effective sensor for powders, since powder levels above the level of the reflecting surfaces will fill the gap and block the rays. As the powder level drops, there will be a free path for the rays and light will be transmitted to the output.

In one particular embodiment a pair of sensors of this nature are provided, one to detect an upper level and one to detect a lower level. It will be recognized that a plurality of sensors of this nature can be so arranged each at a different depth, in order to obtain a graduated reading of level.

The present invention is particularly useful in detecting the amount of a material, such as carbon dioxide, remaining in a cylinder in liquid form under pressure. Such has been a particular problem in the past, weighing being the normal manner of making such a measurement. That is to say, the weight of the cylinder is known and that weight is subtracted from the total weight to determine the amount of substance remaining. In many applications, this is not practical, and the gas in the cylinder can run out unexpectedly. The present invention can be very easily mounted on a cylinder to give such an indication.

In this regard, a particular embodiment of the present invention which can be used with a carbon dioxide cylinder for a beverage dispenser, for example, one for home use, is described. It is described in combination with a particular type of cylinder having a quick disconnect connection to permit ease of replacement in the beverage dispenser. [This quick disconnect method, however, is also useful in many other applications.] In order to permit ease of insertion of the optical sensor into the carbon dioxide cylinder and at the same time make available the necessary valving to permit the quick disconnect, also disclosed, is a special type of valve which gives the necessary clearance for the sensor or a similar axial element to be inserted into the gas cylinder.

BRIEF DESCRIPTION OF THE DRAWINGS

FIG. 1 is a schematic presentation illustrating a first embodiment of the present invention.

FIG. 2 is a view of a part of FIG. 1 helpful in understanding the operation of the present invention.

FIG. 3 illustrates a further embodiment of the present invention useful with both liquids and powders.

FIG. 4 is a perspective view of a sensor according to the present invention for sensing upper and lower levels.

FIG. 5 is an exploded view of means for mounting a sensor according to the present invention in a gas cylinder.

FIG. 6 is a top view of the cap of FIG. 5.

FIG. 7 is a cross section of the fitting used in the arrangement of FIG. 5.

FIG. 8 is a cross-sectional view of a quick disconnect valve according to the present invention adapted for insertion into the fitting of FIG. 7.

DETAILED DESCRIPTION OF THE INVENTION

FIG. 1 illustrates a container 11 having a lid 13. Inserted into the lid 13 is the sensor 15 of the present invention. The sensor 15 comprises an input light pipe 17 and output light pipe 19. Each of the light pipes terminates at its lower end in a reflecting surface which is at an angle of 45° to the longitudinal axis of its respective light pipe. Between the two light pipes, terminating above the level of the reflecting surfaces, is a baffle 21. Light from a source 23 follows the ray path 25 indicated. In the illustrated embodiment, the light is directed into the side of the input light pipe where it is reflected off a 45° surface 27. Although surface 27 will normally be in air, resulting in total internal reflection, it may be coated with silvering to improve its efficiency and avoid interference between input and output light. Light reflected from surface 27 travels along the axis of the light pipe 17 striking the reflecting surface 20a from which it is reflected to the surface 20b of light pipe 19 and then travels along the longitudinal axis of light pipe 19 exiting at the end 22 thereof which is a surface perpendicular to the axis of light pipe 19 where it can be observed by an eye 29. Reflection at surfaces 20a and 20b is due to total internal reflection, which will occur because the index of the air, gas or vapor in container 11 is much lower than the index of the light pipes. As illustrated, at this time, the liquid level of a liquid 31 in container 11 is below the reflecting surfaces 20a and 20b. The input to light pipe 17 may be a perpendicular surface such as at end 22. Similarly, end 22 may have a 45° surface so that light exits from the side.

FIG. 2 illustrates what happens as the liquid level is raised. Only the tip is shown. Because the index of the liquid, and this is true for practically all liquids which are to be sensed, is larger than that of the air gas or vapor, rather than total internal reflection taking place at surface 20a, the light is refracted and never reaches the surface 20b. As a result, there is no light output. Thus, a person placing his eye at the location of the eye 29 of FIG. 1, by looking at the end 22 of the light pipe 19, can determine whether or not the liquid is above or below the reflecting surfaces 20a and 20b. In practice, the light pipe 17 and 19 can be molded in plastic in one piece with the baffle 21 therebetween.

In accordance with Snell's law, the critical angle at the boundary of two given materials at which total internal reflection will take place is given by $\sin \phi_c = (n')/(n)$ where n is the index of the first material and n' the index of the other material.

A typical index for glass or acrylic plastic (and most other plastics) is 1.5. The index of air is 1. Other indices of interest are for example $CO_2$ liquid and gas or vapor. Liquid $CO_2$ has an index of 1.195 and the gas, an index close to 1, as do most gases and vapors. Water has an index of about 1.3. Thus, for air or another gas:

$$\sin \phi_c = (1/1.50) = 0.67$$

and $$\phi_c = 42°$$

Thus the angle of 45° at surfaces 20a and 20b (and at surface 27) will result in total internal reflection when the material on the other side is air or another gas. With $\phi$ now equal to 45°, the critical index $n'_c$, i.e., the index above which internal reflection will no longer take place, can be calculated from:

$$\sin 45° = (n'_c)/(n)$$

or $$n'_c = \sin 45° \ (n)$$

$$n'_c = 0.707 \ (1.5)$$

$$n'_c = 1.0605$$

Thus any substance with an index greater than 1.0605 will cause rays at surfaces 20a and 20b to refract rather than reflect. All known liquids of interest have indices above this value. Similarly the indices of the gases involved are well below this critical value, e.g., the index of $CO_2$ gas is 1.000449 and of water vapor 1.000249.

FIG. 3 illustrates a further embodiment of the present invention. In this embodiment, between the surfaces 20a and 20b, a gap 33 is cut. Operation will be essentially as described above when used with a liquid. Assuming that the end containing the reflecting surfaces 20a and 20b is in a medium with a relatively low refractive index, total internal reflection takes place at the reflecting surface 20a. Light passes through the optical material/air boundary at the edge of the gap. However, since it strikes this boundary perpendicular thereto, there is no refraction. Similarly, it enters the opposite surface perpendicular thereto, again precluding refraction and is then reflected by the surface 20b. When the surfaces 20a and 20b are in a liquid, this sensor operates in the same manner described above in connection with FIGS. 1 and 2. However, the sensor of FIG. 3 can also be used with a powder. When the powder level is below the level of the gap 33, total internal reflection will take place and an output will be received at the end of the light pipe 19. However, as powder fills the gap 33, it will interrupt the path of the light 25 thereby cutting off the output. Thus, once again, an observer can look at the end of the light pipe 19 and tell whether or not the powder level is above or below the notch 33. As an alternative to cutting a gap in the light pipes 17 and 19 may be spaced apart. As long as the boundary surfaces are parallel to the exits, i.e., perpendicular to the light path, proper operation will occur.

In many instances it is desired to sense an upper level and a lower level. FIG. 4 is a perspective view of an sensor assembly 57 which permits doing this. A sensor 15 of the type described above is again provided. A second sensor 15a of identical construction but of shorter length is provided for sensing the upper level. A baffle 37 is inserted between the two sensors to prevent light passing from one to the other. The embodiment of FIG. 4 shows two sensors, one sensing an upper and one sensing a lower level. The overall assembly 57 has a cylindrical cross section, each sensor being semi-cylindrical in cross section. It will be recognized that additional sensor sensing levels between an upper and lower level may be installed in order to provide a graduated output to determine exactly how much liquid, or powder, in the case of embodiment according to FIG. 3, remains in the vessel. In the embodiment of FIG. 4, the overall sensor assembly 57 is cylindrical to aid in mounting to a gas cylinder in the manner described below.

As noted above, the present invention is particularly useful in connection with sensing the level in a high pressure liquifiable gas cylinder. The lower level sensor tells the user when the cylinder is about to run out and should be refilled or replaced. The upper level can be used in refilling the cylinder to the proper level.

FIG. 5 is an exploded view of a manner of mounting the sensor of the present invention to a gas cylinder. A fitting 41 is provided having a screw thread 43 on the end thereof for screwing into a properly threaded bore in the top of a cylinder. Sealing is accomplished by means of an O-ring 45 or by tapering thread 43. The fitting 41 contains openings in the opposite sides thereof, such as the opening 47, for installing a burst disc valve and a quick disconnect valve, for example. The top of the fitting 41 contains a threaded recess 49 which receives an O-ring 51. Disposed over the O-ring 51 is a thick walled, flanged clear plastic member 53. The plastic member 53 contains a central bore 55 sized to receive the sensor assembly 57 of FIG. 4, made up of the sensors 15 and 15a, with a press fit. To hold member 53 in place a threaded cap 59 which closely fits over the member 53 and screws its flange 54 down tightly within the bore 49 against the O-ring 51 by means of a flanged threaded portion is screwed into recess 49. The cap 59 contains a hole 61 in the side thereof. The hole 61 permits supplying input light to both the sensor 15 and the sensor 15a since it overlies a portion of the top 45° portion of each when they are inserted. Light thus enters the opening 61, passes through the clear plastic cap 55 and into the two sensors, where it is reflected by the 45° reflecting surface 27 of FIGS. 1 and 4 to travel longitudinally along the two light pipes in the manner explained above. In order to prevent light from traveling through the cap 53 to reach the output light pipe, it is preferred that a baffle 56 be provided between member 53 and the assembly 57, except in the area of the hole 61. Light which is reflected back to the output light pipe can be observed in holes in the top of the cap 59 as illustrated by FIG. 6 which is a top view of the cap. As shown, there is an opening 63 for the lower level output light pipe and an opening 65 for the upper level output light pipe. This provides a simple, easily installed sensor. In many instances, the source of light which is the input to the opening 61 need only be ambient light. Alternatively, one can shine a flashlight or place another light source adjacent thereto. One then simply observes the top of the cap 59 at the holes 63 and 65 to determine the level within the gas bottle.

As an alternative to having a separate fitting 41, it should be recognized that the neck of the cylinder can be extended and provided with suitable openings such as the opening 47 for the installation of valving and the end of the bottle provided with a suitable recess, such as the recess 49, threaded to accept a cap such as the cap 59.

Normally, when a quick disconnect valve is utilized with such a fitting such as fitting 45, it extends all the way across the fitting. However, such is not possible in the illustrated embodiment since sensor assembly 57 must extend along the axis of the fitting. Thus, it was necessary to find a valving mechanism which could be contained within a smaller depth, i.e., within the wall thickness of the fitting or cylinder neck. Furthermore, fittings of this nature also must contain a pressure relief mechanism such as a burst disc assembly adapted to burst under conditions of excessive pressure. As illustrated by the cross section of FIG. 7 the fitting 41 contains, in addition to the opening 47, an opening 71 for containing the burst disc assembly. This opening is threaded and the conventional assembly with the burst disc is screwed therein.

The quick disconnect valve is shown in cross-sectional view in FIG. 8. It includes a valve seat member 73. This is essentially a cup-shaped member having an annular flange 75. Cup-shaped member 73 contains a interior projection 77 which is either screwed or press-fitted therein. A spring 78 biases member 73 outwardly acting between the flange 75 and a surface 79 on a threaded part 80 of the valve. Part 80 contains an interior annular projection 81 with a sharp edge 83 which, in the closed position abuts against the bottom surface 85 of the cup-shaped part which is covered with a valve seat 86 of hard rubber or the like. Part 80 is in the nature of a hollow externally threaded annular nut which is screwed into appropriate threads in the opening 47. As an alternative to forming surfaces 79 on part 80 they may be on the fitting 41 so that when part 80 is screwed into place, the spring 78 biases the cup-shaped part 73 against the sharp edge 83 of the annular inward projection 81. Such surfaces are shown in FIG. 7. In either case the biasing of spring 78 closes the valve. When a connection is made, the connecting piece contains a pin which pushes against the projection 77 to move the cup-shaped part 73, acting against the biasing force of the spring 78, to lift the base 85 away from the sharp edge 83 of annular projection 81. Gas can then flow from inside the fitting 41 through a plurality of ports 87 formed in the walls of cup-shaped part 73 and thence through the central opening 89 in the outer part of the valve. Of course, appropriate sealing will be provided between part 80 and the appropriate matching fitting used to make the quick disconnect. Such a quick disconnect utilizing a conventional valve structure is shown, for example, in copending application Ser. No.

The combination of this type valve, in a fitting such as the fitting 41, along with a sensor assembly such as the sensor assembly 57 provides a particularly advantageous gas cylinder package which can be easily connected and disconnected and in which it is easy to determine when the cylinder is almost exhausted and needs to be replaced. As noted above, it is a further advantage, if the neck of the cylinder is extended and formed appropriately to receive the parts which, in the illustrated embodiment are installed in the fitting 41. In such a case, the fitting 41 simply becomes part of the neck of the bottle and the sensor 57, burst disc assembly and the quick disconnect valve are installed directly in the neck of the bottle avoiding the need for a separate fitting 41. Such a gas bottle is disclosed in copending application Ser. No. It is also noted that the compact valve of the present invention may be used in other applications where the space along the axis of the cylinder must be kept clear for installation of other apparatus.

What is claimed is:

1. In combination with a gas cylinder capable of storing a liquefiable gas, the gas cylinder having a threaded recess disposed at the top of the cylinder, a sensor for sensing upper and lower levels in the gas cylinder comprising:
 (a) a sensor assembly including a first level sensor and a second level sensor both of identical design but of different lengths, the lengths of said first and second level sensors being selected to represented an upper level and a lower level, each level sensor comprising:
   (i) an input light pipe with an axis having an input surface at one end and terminating in an essentially 45° surface with respect to its axis at the other end;
   (ii) an output light pipe with an axis adjacent said input light pipe having an essentially 45° surface with respect to its axis opposite that of said input light pipe and having an output surface at its other end, an essentially non-refractive light path formed between said 45° surfaces, whereby, when said 45° surfaces of said light pipes are in a material of relatively low index, light at said input surface will be transmitted through said input light pipe, will be reflected at said 45° surfaces from said input light pipe to said output light pipe and will be transmitted to said output surface in said output light pipe, due to total internal reflection, but, when said 45° surfaces are in a material of higher index, light will be refracted at said 45° surfaces of said input light pipe and will not reach said output surface; said first and second level sensors in abutting relationship; and (iii) a baffle disposed between said first and second level sensors;

(b) a seal disposed in said cylindrical recess;

(c) a transparent cylindrical cap member having an internal bore adapted to accept said sensor assembly with a press fit, having a flange at its bottom sized to fit in said cyindrical recess atop said seal; and (d) a metal cover including an internal bore sized to tightly surround said transparent cap member and having external threads for screwing into said threaded recess, said metal cover having an input opening in the side thereof overlying the input surfaces of said first and second sensors and first and second output openings in the top thereof overlying the output surfaces of said first and second sensors.

2. A level sensor according to claim 1 wherein said input and output light pipes are in abutting relationship and further a baffle between said input light pipe and output light pipe, terminating above the area of said 45° surfaces.

3. A level sensor according to claim 1 and further including a 45° surface at the input end of said input light pipe, said input surface being in the side of said input light pipe, input light being reflected from said input 45° surface along the axis of said light pipe.

4. A level sensor according to claim 3 and further including a reflective backing on said input 45° surface.

5. The combination according to claim 1 and further including a quick disconnect valve in said gas cylinder.

6. The combination according to claim 5 wherein said quick disconnect valve is disposed in a neck portion below said theaded cylindrical opening.

7. The combination according to claim 6 wherein said valve is disposed in a threaded opening in the side of said neck portion, said valve comprising:

(a) hollow annular nut having on the inside thereof an internal annular projection with a sharp edge, said nut screwed into said opening in said side;

(b) a valve seat member comprising a cup-shaped member having an outwardly extending flange at its open end, the base of said cup-shaped member forming a valve seat surface which cooperates with said annular projection with a sharp edge;

(c) means acting against said flange and biasing said cup-shaped member against said annular projection on said nut; and (d) a plurality of openings in the walls of said cup-shaped member.

8. The combination according to claim 7 wherein said means biasing comprise a spring acting against said flange on said cup-shaped member.

9. The combination according to claim 8 and further including an internal projection on said cup-shaped part extending into the center of said annular projection with a sharp edge, whereby a quick disconnect connection can be made to said hollow annular nut and communication with said gas cylinder established by unseating said valve by acting on said projection against the biasing force of said spring.

10. The combination according to claim 9 and further including a burst disc assembly disposed in another opening in said neck portion.

11. The combination according to claim 10 wherein said neck portion containing said openings comprises a separate fitting attached to a cylinder with a conventional neck thereby elongating said neck so as to be able to accept said sensor assembly and quick disconnect valve.

12. The combination according to claim 10 wherein said gas cylinder is formed with an elongated neck and said openings are formed in said elongated neck.

* * * * *